United States Patent [19]

Sohmer et al.

[11] 4,039,700

[45] Aug. 2, 1977

[54] HARD METAL COATING PROCESS FOR METAL OBJECTS

[75] Inventors: Oskar Sohmer, Stuttgart; Heinz Autenrieth, Korntal; Kuno Kirner, Gerlingen, all of Germany

[73] Assignee: Robert Bosch G.m.b.H., Stuttgart, Germany

[21] Appl. No.: 463,255

[22] Filed: Apr. 23, 1974

[30] Foreign Application Priority Data

May 9, 1973 Germany .................. 2323242

[51] Int. Cl.$^2$ .................. B05D 3/02; B05D 3/14; B05D 1/34; B05D 1/36

[52] U.S. Cl. .................. 427/46; 76/101 A; 76/101 R; 219/10.57; 427/47; 427/49; 427/190; 427/191; 427/196; 427/199; 427/376 D; 427/201; 427/225

[58] Field of Search .................. 427/45, 46, 47, 49, 427/190, 191, 192, 196, 198, 199, 201, 202, 225, 319, 328, 376; 76/101 A, 101 R; 219/9.5, 10.57

[56] References Cited

U.S. PATENT DOCUMENTS

| | | | |
|---|---|---|---|
| 2,755,199 | 7/1956 | Rossheim et al. | 427/49 |
| 3,101,274 | 8/1963 | Beyerstedt et al. | 117/46 |
| 3,449,146 | 6/1969 | Dawson | 427/46 |
| 3,573,963 | 4/1971 | Maxwell | 117/71 |
| 3,755,866 | 9/1973 | Ohlson | 29/95 C |
| 3,809,546 | 5/1974 | Prasse et al. | 117/93.1 |
| 3,844,729 | 10/1974 | Sedlatschek et al. | 29/195 |

FOREIGN PATENT DOCUMENTS

| | | | |
|---|---|---|---|
| 1,254,936 | 11/1967 | Germany | 427/46 |
| 1,185,869 | 3/1970 | United Kingdom | 427/46 |

OTHER PUBLICATIONS

The Proximity Effect, Its Application To The Concentration Of Heating Currents In Predetermined Strips, E. Bennett, The U. of Wisconsin Eng. Exp. Station, 1932.

Primary Examiner—Ronald H. Smith
Attorney, Agent, or Firm—Flynn & Frishauf

[57] ABSTRACT

Powdered binder metal and hard metal granules are deposited in measured quantities on the cutting edge of a metal blade. When these materials both have a magnetic component, an electromagnet with an elongated air gap is used to pick up quantities determined by the amount of exciting current and to deposit them on the surface to be coated. A high-frequency heating current flows through the object being coated and also through a nearby inductor in series. This produces a short heating cycle in which the binder metal is melted, this being done in a protective gas atmosphere and without the presence of a flux. The object to be coated is held in a clamping device provided with a cavity around the surfaces to be coated, which include adjacent side surfaces as well as the edge of the blade, and the clamping plates also operate as heat sinks. The method and apparatus can also be used for sintering on a coating, but that requires a longer heating cycle.

12 Claims, 5 Drawing Figures

HARD METAL COATING PROCESS FOR METAL OBJECTS

This invention relates to a process and apparatus for producing a wear-resistant hard metal layer on a metal object by the application of binder metal and hard metal granules to the object, especially for producing such a layer on the cutting portion of a steel saw blade.

A method for producing a hard wear-resistant coating on metal objects is known in which a binder metal and hard metal granules are applied to the object surface with a flux and then made fast to the metal object by sintering. This method requires, in order to carry out the sintering operation, good adhesion of the components of the coating to the metal object, which can be obtained only by the use of an additional layer of a solution of shellac in alcohol as an adhesion agent.

It is also known to apply the principle of conductive heating for hardening, by using a high-frequency heating current with the inductor through which it flows so arranged that the current path passes through the work piece, thus providing a heating effect.

It is an object of this invention to produce a wear-resistant layer on steel saw blade with simple manufacturing and process means and thereby to produce a layer that can be used in cutting or abrasive machining of materials that are difficult to machine. Such materials, for example, are synthetic resin materials with hardening or stiffening fillings such as glass, stone and the like. Other such materials are certain metals and metal alloys.

It is a further object of the invention to provide such a hard layer that will have a prolonged useful life compared to the known wear-resistant layers.

Subject Matter of the Present Invention

Briefly, binder metal powder and hard metal granules are deposited edgewise onto a steel saw blade to be coated, and then immediately heated with high frequency current, at least partly by conduction, in a protective gas atmosphere without a fluxing medium being present. The heating is done in an elongated loop of which the blade edge is an inward-facing part opposite the return side of the loop, thus concentration conduction current along the blade edge. This process is particularly favorable as a manufacturing technique, because it is readily automated and the treatment times for individual objects are especially short. By using conductive heating along with concurrent induction heating there is obtained, in addition to short heating time, a good concentration of the heating zone and hence a very small tendency for distortion of the blade body. The method has been found particularly useful for producing a cutting edge on untoothed steel saw blades with which it is possible to saw very hard materials, as for example glass or synthetic resins with hard material fillings. By the use of fine grained hard metal granules and larger quantities of binder metal it is possible to provide coatings also on other metal objects, for example cutting tools, where it is mainly a question of wear resistance and not of material removal. The most practical manner of practicing the method is to hard-solder the hard metal layer onto the object, because in this case the treatment time can be held particularly short. It may also be possible, however, to sinter on the hard metal layer, particularly after a sintering process with a liquid phase.

The binder metal is advantageously deposited on a blade blank in powdered form, because it then sticks so well to the hard material granules. Nickel alloys, cobalt alloys or low-melting iron alloys with boron and/or silicon content or additions are particularly suitable as binder metals. The hard material granules are generally referred to as hard metal granules, although they are largely composed of carbides rather than pure metals. Such materials are referred to as hard metals, because it has long been recognized that the hardening component in many hard metal alloys is commonly a carbide phase in the alloy structure. The hard metal granules particularly suitable for the practice of the present invention, are crushed scrap particles of hard metal cutting alloys containing tungsten carbide and/or titanium carbide in a cobalt base. Both the binder metals above named and the hard metal granules are magnetizable, so that the measuring out of both these components can be carried out very well in practice without expensive apparatus by magnetic methods. The magnetic measuring of these materials, moreover, is very precise, particularly when the hard metal granules and the binder metal are brought into place in separate operations. The process can be simplified at the cost of slightly less precision if the hard metal granules and the binder metal are mixed before measuring out and thus brought to the metal object together, because in this case one feed operation can be saved.

For the coating of blade edges, an elongated magnet with a narrow gap excited by direct current has proved particularly practical as a magnetic measuring feed device for the coating materials. The magnet is preferably of horse shoe shape in cross-section. Such a magnet is easily provided with the necessary electric winding and makes possible an exact measuring out of the materials by holding a quantity of material proportional to the excited current in its air gap. The excitation used for the measuring out of the material is a direct current excitation. To prevent the sticking of small quantities of binder metal and/or hard metal granules on the magnet after switching off the direct current excitation, the magnet is either mechanically knocked or a supplementary alternating current excitation is applied immediately after switching off the direct current and is rapidly attenuated or damped thereafter.

Hard solders are also suited to operate as binder metals in the present process, but these are not ferromagnetic, however, so that they are not transportable or subject to be measured out by a magnetic device. In this case a mechanical device is to be used for transport and measuring out of the material and a number of mechanical devices are suitable, particularly those using feed screws, feed rolls or a vibrating feed. According to the design and construction of the feed device it can also be useful to pre-form the binder metal in the shape of a tube or a U-channel and to fill such pre-forms of binder metal with the hard metal granules, or else to provide the binder metal in wire form and to melt the binder onto the surfaces of the hard metal granules, particularly by an inductive method, so that the granules so coated can be deposited for applying both materials to the blade edge for further treatment.

In the case of coating saw blades, it is advantageous to apply the hard metal layer not only on the edge surface, i.e. the cutting edge, but also on the portions of both sides adjoining the cutting edge, since the saw blade can then cut itself free, as in the case of the setting of saw teeth, and will not jam.

As concerns the apparatus used for carrying out the method, it is desirable to hold the saw blade clamped in a vise or other clamping device, with two copper clamping plates holding the blade on both sides except for the surface to be coated. In this fashion the clamping device not only holds the object, but the provision of the clamping plates in massive form, with or without the further provision of water cooling, serves to cool the object to be coated. In this way it is possible to prevent warping of the blade on the one hand and, on the other hand, to prevent the transfer of heat to the parts of the blade that are not to be heated and ultimate failure of the hardened object. It has been found useful to provide the clamping device in such form that a chamber is provided in the neighborhood of the surface to be coated, formed by a cavity in the clamping device. The blade to be coated can then easily be mounted in that chamber without risk of poor uniformity of the layer resulting from accumulation of coating material that has fallen off on one or both sides of the object. In order to prevent the coating material from becoming stuck to the clamping device after heating, the surface of the clamping device, at least in the region of the above-mentioned chamber, and preferably also in the neighborhood of the surfaces adjacent to the blade to be coated, are covered with a protective layer of ceramic oxide. This protective layer can conveniently be sprayed on by a so-called plasma gun and a layer so provided has a high-melting point and, as just mentioned, prevents sticking of the coating materials used in the process. A plasma gun, or plasma jet is known for instance, from an article in Chemical Processing, June 1962, p. 8. In the region of the mounting of the metal object in the clamping device electrical insulation is built up at the same time between the clamping plates and the metal object, so that the heating current cannot flow through the clamping plates. The oxide coating should be thin in the area where the metal object is mounted in the clamping plates, so that no appreciate reduction of the heat transfer to the clamping plates takes place.

The heating current, in accordance with the invention, is a high frequency current that is fed into the outer circuit of an inductor. For conductive heating saw blade to be coated constitutes a part of the circuit excited with high-frequency current, in which there is located the inductor, in this case a conducting tube or the like running parallel to the blade edge so that compared to inductive heating there is an increase or efficiency in the conversion of the heating power.

In order to prevent premature oxidation of the melted binder metal, the entire apparatus is enclosed in a protective gas chamber equipped with two fixed contact terminals for the supply of the high frequency energy. There are few parts to be moved in such an apparatus, so that the apparatus is very simply constituted.

The invention is further described by way of example with reference to the accompanying drawings, in which.

Figure 1:
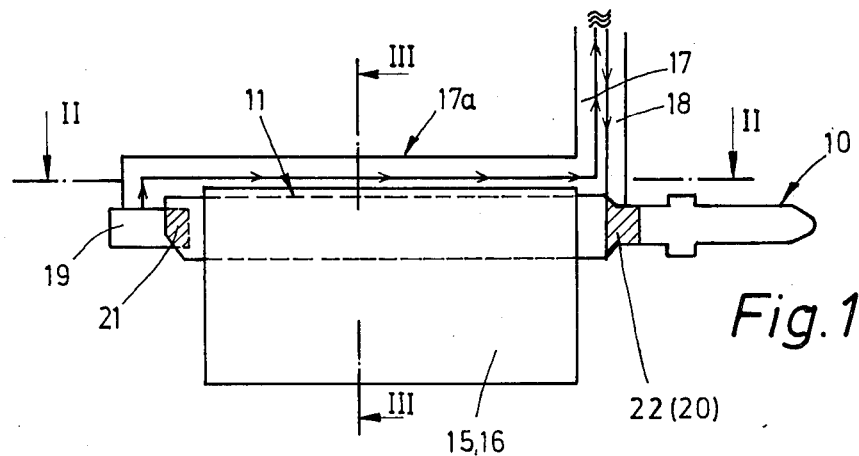
FIG. 1 is a basic diagram of an apparatus for carrying out the process of the invention.

FIG. 1 shows a steel sabre saw blade 10, representative of a metal object to be coated with a hard metal layer 12 on its cutting edge 11. The hard metal layer 12 consists of a binder metal 13 and hard metal granules 14. The cutting edge 11 of the saw blade 10 is untoothed. The saw blade is held between two copper clamping plates 15 and 16, which are capable of being water cooled in cases of high cooling requirements. The supply of high-frequency heating energy is provided electrically over two conductors 17 and 18, with the inductor section 17a serving to determine the current path in the blade body. The lead conductors 17 and 18 are connected with two fixed contact terminals 19 and 20 over which contact is made to the saw blade 10 at the locations 21 and 22. The arrows in FIG. 1 show the flow of current in the apparatus for some particular moment. As there shown, the current flows over the lead conductor 18, the contact terminal 20, the cutting edge of the saw blade 10 facing the inductor 17a and then back over the contact area 21, the contact terminal 19, the inductor 17a and the current lead 17. The behavior of the current is conditioned by the physical fact that in the case of a high-frequency alternating current the inductive impedance greatly exceeds the ohmic resistance, and that the current consequently chooses its path so that the surface enclosed by the conductors is a minimum. This is then the case when the current that passes through the metal object is to be heated flows back in the immediate neighborhood of the inductor 17a. Since, moreover, the skin effect of the high-frequency current is maintained, there results a locally narrowly limitable heating zone that can be effected primarily by the frequency of the current and the distance of the return conductor, hence of the inductor 17a. The metal object to be heated, in the present case the saw blade 10, forms part of the high-frequency current circuit. The efficiency of the current transmission is still greater than in the case of inductive heating, because practically no transmission losses arise.

Figure 2:
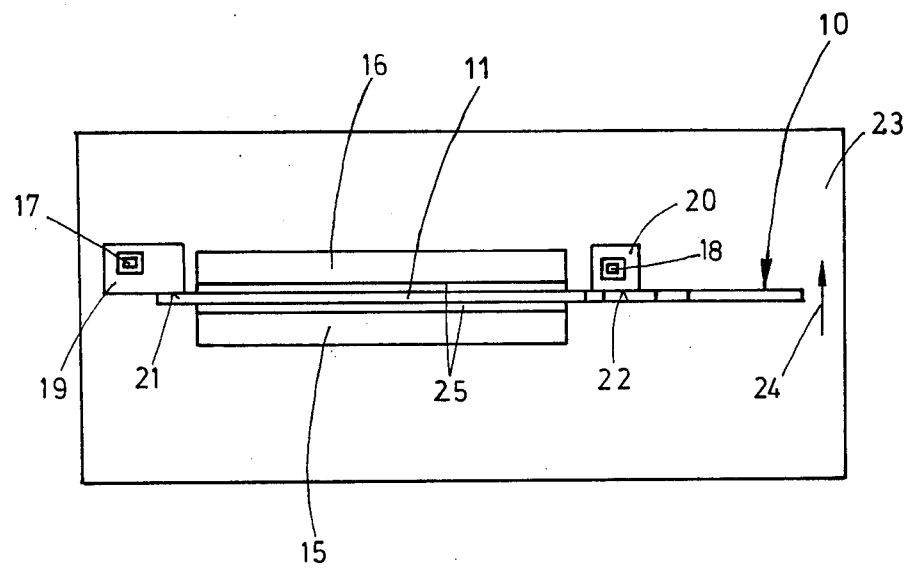
FIG. 2 is a plan view of the apparatus as arranged in a protective gas chamber, as viewed from the line II—II of FIG. 1.

FIG. 2 shows diagrammatically a protective gas chamber 23 in which the contact terminals 19 and 20 for the leads 17 and 18 for the high-frequency energy are affixed in position. The portion of the apparatus comprising the clamping blades 15 and 16 and the saw blade 10 are moved up against the contact terminals 19 and 20 in the direction of the arrow 24. Because of the high frequency of the energy to be transferred, no appreciable losses at the contact positions is to be feared. A chamber 25 is hollowed out in the clamping device constituted of the clamping plates 15 and 16, in the region of the part of the surface of the saw blade 10 that is to be coated.

Figure 3:
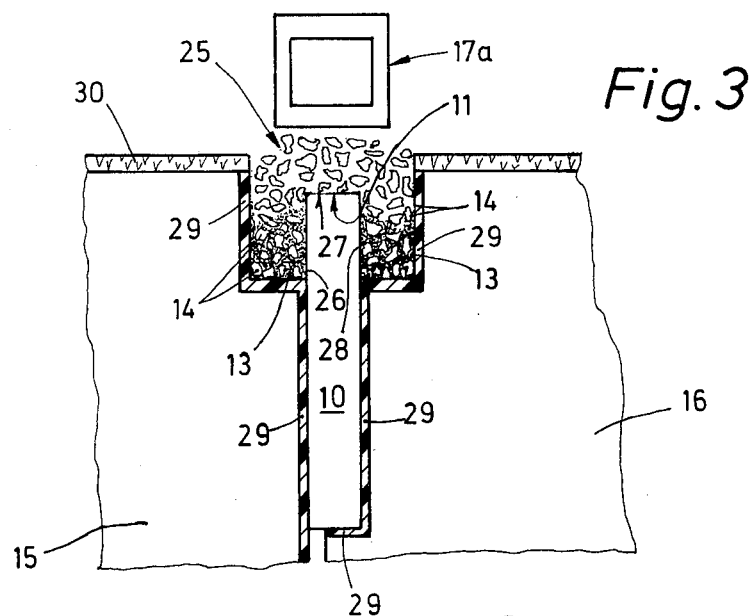
FIG. 3 is a magnified cross-section, not drawn to scale, corresponding to the line III—III of FIG. 1.

FIG. 3 is a magnified cross-section of the chamber 25, opening up between the upper portions of the two clamping plates 15 and 16. The metal object to be coated, namely the saw blade 10, is clamped in the vise except for the surface portions 26, 27 and 28 that are to be coated. The clamping plates 15 and 16, in the region of the chamber 25 and in the region of the surfaces that engage the saw blade 10, are covered with a protective layer 29 of ceramic oxide that melts at a high temperature, having been coated with this protective material by a plasma gun spray process.

The surfaces of the clamping plates 15 and 16 facing the inductor 17a are protected by a layer of Al$_2$O$_3$ in the form of a plate 30 fastened on with adhesive or in some mechanical way. The protective layer 29 and the plates 30 have the effect of counteracting the sticking of hard metal granules on the clamping plates 15 and 16. In the region of the engagement of the saw blade 10 with the clamping plates 15 and 16, the protective layer 29 must be kept thin so that heat is quickly conducted away to the clamping plates which may be water cooled if necessary. In this manner the loss of the temper of the saw blade 10 can be avoided. The clamping plates are made of copper on account of its good heat conduction, but brass or aluminum plates, for example, are nevertheless also suitable.

Electrical insulation between the clamping plates 15 and 16 and the saw blade 10 is obtained as the result of the protective layer 29, so that the high-frequency current cannot flow over the clamping plates. Only a small residual current resulting from secondary induction flows in the clamping plates.

Figure 4:
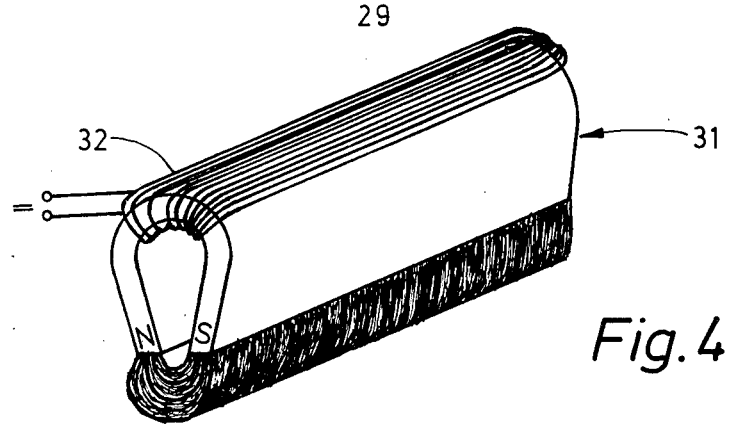
FIG. 4 is a perspective view of a measuring feed magnet.

The process of the invention for producing a wear-resistant hard metal layer of hard metal granules in a binder metal on the cutting edge of the steel saw blade is set forth in further detail in the following description with reference to FIGS. 3 to 5. In this process the binder metal 13 and the hard metal granules 14 are first laid on the metallic object to be coated in measured quantities, and then heated conductively without the provision of flowing agent (flux), the heating being carried out in a protective gas atmosphere. In the case of manufacture of a saw blade for cutting very hard material, as for example glass or synthetic resins reinforced with hard material, the hard metal layer is laid on the untoothed cutting edge 11 of the steel saw blade 10 in the manner of a hard soldering operation, with the heating carried out by a known conductive heating method. Binder metal and hard metal granules are brought into the chamber 25 in separate operations, because in this way a particularly exact measuring out of the two quantities is obtainable. The binder metal 13 is made available to the process in pulverized form. For hard metal granules, which according to the particular application may have a grain size from about 0.1 to 0.5 nm, crushed scrap particles of hard metal cutting alloys of tungsten carbide on a cobalt base are used. For the binder in this illustration, nickel alloys with a boron and/or silicon content, in the composition range of 1.5 – 4% boron; 2 – 4% silicon; 9 – 16% chromium; 1 – 5% iron; 0.03 – 0.9% carbon and the rest nickel. Hard solders are also suitable as binder metals, but these are not ferromagnetic and therefore not suitable for magnetically measuring out in the method used for feeding the hard metal granules 14 and the binder metal 13 in separate operations. For these operations an air gap magnet 31, as shown in FIG. 4, is particularly suitable. This magnet has an elongated shape of horse shoe cross-section and its length corresponds to the length of the hard metal layer to be applied. The excitation of the air gap magnet 31 is produced by means of direct current in a winding 32 and the extent of excitation is determinative of the quantity of the magnetizable material picked up. This material remains in the gap between the poles designated N and S, respectively, and can be dropped by shutting off the excitation after transportation from a suitable supply container to the heating apparatus. The sticking of small quantities of binder or of tungsten carbide scrap can be hindered either by knocking mechanically or by a supplementary alternating current excitation. The tungsten carbide scrap maintains its magnetic properties because of its cobalt component.

Instead of magnetically measuring out the materials, a measured feed by a mechanical method is also possible and may actually be more favorable for some constructions of the apparatus as a whole. Vibrating feed devices and similar apparatus for measured feed come particularly into consideration in this respect.

Figure 5:
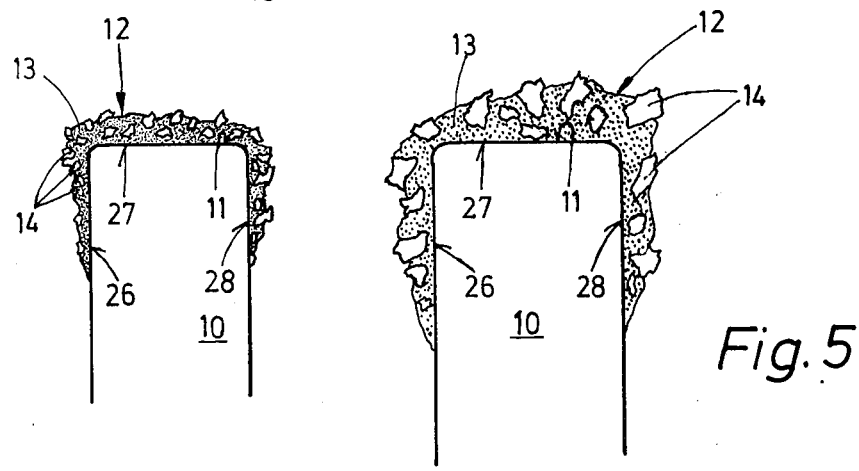
FIGS. 5a and 5b are cross-sectional views of portions of a metal object coated with a hard metal layer, FIG. 5a showing a fine grain layer and FIG. 5b showing a coarse-grained layer.

As shown in FIGS. 3 and 5, the hard metal layer is laid onto the edge surface, the actual cutting edge 11, and onto the surface portions 26 and 28 on both sides of the saw blade 10 adjoining the cutting edge. The binder metal melts and distributes itself by surface tension along the surface of the saw blade 10 that is to be coated. The hard metal granules 14 are more or less completely embedded in the binder metal layer according to their grain size. A large grain size of the hard metal granules and a small proportion of binder metal results in a high cutting speed, but a lower wear resistance than the combination of small hard metal granules and much binder metal. The heating time to melt the binder metal 13, in the case of conductive heating, is in the range of 1 to 2 seconds. A binder layer of usual composition of 84% nickel, 10% cobalt, 3–4% silicon, 2% boron, 0.5% iron and 0.04% carbon has a melting point of about 1000° C. Sintering on the hard metal layer instead of brazing or soldering it on with a binder metal is likewise possible, but in this case the duration of the operation is substantially lengthened. For oxides for production of the plasma gun sprayed high-melting protective layer 29, suitable materials are particularly Cr$_2$O$_3$, TiO$_2$ and ZrO$_2$ and also spinels and mixed or multiple oxides. In certain cases, in which the melting point of the binder metal lies below about 1000° C, also Al$_2$O$_3$. For the protective gas preferably so-called forming gas is used, a mixture of about 10% H$_2$ and 90% N$_2$. This gas does not burn and is not explosive.

Although the invention has been described with reference to a particular example, it is to be understood that variations and modifications may be made within the inventive concept.

We claim:

1. A process for the production of a wear-resistant hard metal layer on a steel saw blade, consisting essentially of the steps of:

depositing a powdered binder metal (13) and granules of hard metal (14), in the absence of fluxing medium, edgewise on a steel blade to be coated, thereafter heating the steel blade in a protective gas atmosphere in the continued absence of fluxing medium by causing high-frequency electric current to flow in a circuit of which said blade forms a part of the current path and which contains a linear return conductor disposed parallel to the edge of the blade to be coated and having one end thereof connected to an end of the blade, so as to provide an induction loop together with said blade in which current is returned from said blade on a path facing the portion of said blade on which said binder metal and said granules are deposited, whereby said current is concentrated in said portion of said blade, until the binder metal melts, and then interrupting the flow of said high-frequency current, whereby hard metal granules are brazed onto said blade along its edge.

2. A process as defined in claim 1 in which the steel blade (10) edge on which binder metal are applied edgewise is untoothed.

3. A process as defined in claim 1 in which said binder metal (13) is applied to the steel blade by depositing it on the blade edge in pulverized form prior to the depositing of said hard metal granules thereon.

4. A process as defined in claim 1 in which said hard metal granules (14) comprise broken-up particles of hard cutting alloys selected from the group consisting of tungsten carbide in a cobalt matrix, titanium carbide in a cobalt matrix and both tungsten carbide and titanium carbide in a cobalt matrix.

5. A process as defined in claim 1 in which said binder metal (13) consists of a substance selected from the group consisting of nickel alloys, cobalt alloys and low-melting iron alloys, in each case alloys containing as alloy additives a substance selected from the group consisting of boron without silicon, silicon without boron and both boron and silicon together.

6. A process as defined in claim 1 in which said binder metal is a hard solder.

7. A process as defined in claim 1 in which at least one of the components of the mixture of hard metal granules (14) and binder metal (13) is deposited over the steel blade in roughly measured quantities as a separate step by a magnetic method.

8. A process as defined in claim 7 in which the said magnetic method utilizes a magnet with a longitudinal gap (31) provided with direct current excitation and in which said magnet (31), immediately after withdrawal of direct current excitation, is briefly excited with a damped alternating current.

9. A process as defined in claim 1 in which at least one of the components of the hard metal granule and binder metal mixture is measured out mechanically by a vibrator feed device as it is applied to said steel blade.

10. A process as defined in claim 1 in which, during the heating step heat is removed, through a refractory electrical insulation layer barrier, from portions of the blade spaced from the cutting edge thereof by a predetermined minimum distance, thereby minimizing thermal distortion of the blade.

11. A process as defined in claim 1 in which the saw blade during said process is clamped with its cutting edge upturned and horizontal, by means of cooled clamping jaws engaging the lower portion of the blade along its length, with interposition of an electrically insulating layer thin enough to permit easy heat transfer, the clamping by said jaws being provided in a manner forming a trough chamber from the bottom of which the blade protrudes, and in which process, further, said powdered binder metal (13) and said hard metal granules (14) are deposited by dropping from above, so that some deposited material rests on the upturned edge of the saw blade and other material dropped at the same time fills the trough chamber, whereby in the heating step using high-frequency electric current, the concentration of the heating effect near the upturned edge of the saw blade melts the binder metal only in the region adjacent thereto, to produce a hard facing not only on said cutting edge but also on the thereto adjoining portion of the side faces of the saw blade.

12. A process for the production of a wear-resistant hard metal layer on a steel saw blade, consisting essentially of the steps of:

depositing edgewise on a steel blade to be coated, in the absence of fluxing medium, granules of hard metal which have been coated with a binder metal (13) in a previous step in which the hard metal granules (14) had the binder metal melted onto their surfaces, thereafter heating the steel blade in a protective gas atmosphere in the continued absence of fluxing medium by causing high-frequency electric current to flow in a circuit of which said blade forms a part of the current path and which contains a linear return conductor disposed parallel to the edge of the blade to be coated and having one end thereof connected to an end of the blade, so as to provide an induction loop together with said blade in which current is returned from said blade on a path facing the portion of said blade on which said coated granules are deposited , whereby said current is concentrated in said portion of said blade, until the binder metal coating of the granules melts, and then interrupting the flow of said high-frequency current, whereby hard metal granules are brazed onto said blade along its edge.

* * * * *